United States Patent
Shimizu et al.

(10) Patent No.: US 7,120,382 B2
(45) Date of Patent: Oct. 10, 2006

(54) IMAGE FORMING APPARATUS AND CONTROL METHOD FOR ROTATING IMAGE DATA BASED ON SHEET TYPE AND ORIENTATION

(75) Inventors: Yasushi Shimizu, Kanagawa (JP); Hidehiko Asai, Kanagawa (JP); Kazuhiro Kasai, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 890 days.

(21) Appl. No.: 09/858,997

(22) Filed: May 16, 2001

(65) Prior Publication Data
US 2002/0085222 A1   Jul. 4, 2002

(30) Foreign Application Priority Data
May 17, 2000   (JP)   ............................ 2000-145699

(51) Int. Cl.
*B41B 23/00* (2006.01)
(52) U.S. Cl. .................. 399/392; 358/448; 358/449; 382/296; 382/297
(58) Field of Classification Search ............... 358/296, 358/448, 449, 1.1, 1.18, 1.12, 1.15; 399/38, 399/84; 382/297
See application file for complete search history.

(56) References Cited

U.S. PATENT DOCUMENTS

| | | | | |
|---|---|---|---|---|
| 5,521,720 A | * | 5/1996 | Yoshida | 358/448 |
| 5,558,454 A | * | 9/1996 | Owen | 402/79 |
| 5,638,181 A | * | 6/1997 | Kubo et al. | 358/296 |
| 6,120,015 A | * | 9/2000 | Albright et al. | 270/58.07 |
| 6,215,977 B1 | * | 4/2001 | Otani | 399/407 |
| 6,549,299 B1 | * | 4/2003 | Allen et al. | 358/1.18 |

* cited by examiner

*Primary Examiner*—Kimberly Williams
*Assistant Examiner*—Peter K. Huntsinger
(74) *Attorney, Agent, or Firm*—Rossi, Kimms & McDowell, LLP

(57) ABSTRACT

To obtain proper output results regardless of the type of recording sheets and obtain the user's desired output results without having the user perform cumbersome operations, the user operates an operating section to select a sheet feeding stage, gives an instruction to start copying, and then a controller section 15 of an image forming apparatus determines whether or not a 180° rotation mode for rotating image data through 180° is set and/or whether or not preprint sheets are used for recording. If the answer is negative, the image data are output based on normal settings. On the other hand, if the answer is affirmative, the image data are output after being rotated through 180°.

22 Claims, 13 Drawing Sheets

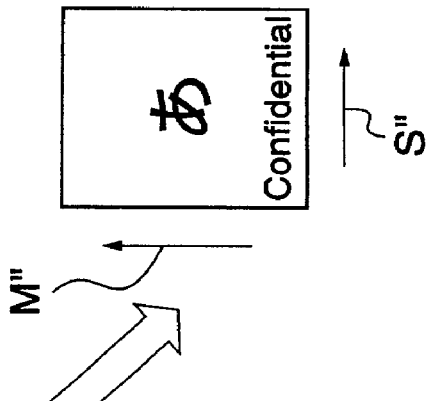
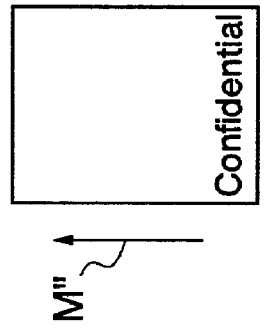
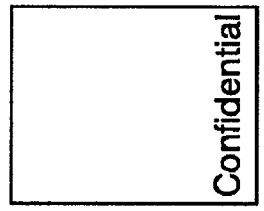

FIG. 12
PUNCHING PROCESS NOT EXECUTED
ON PUNCH SHEETS
FIG. 13A
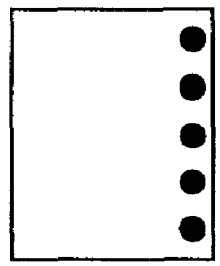
FIG. 13B
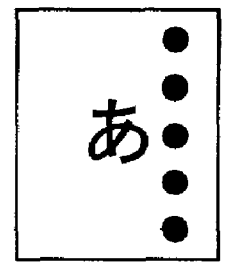

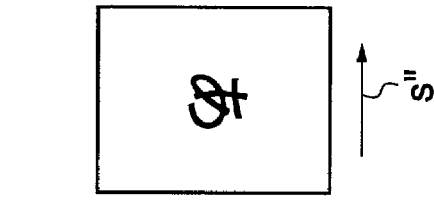
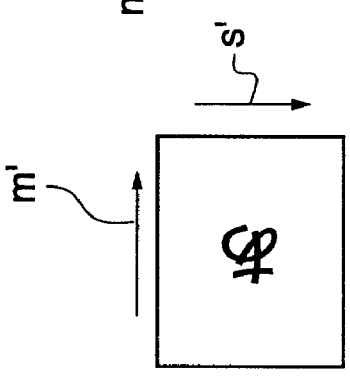
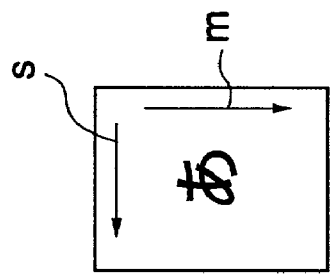
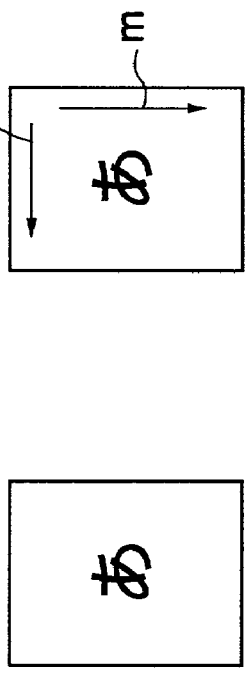
FIG. 14A PRIOR ART
FIG. 14B PRIOR ART
FIG. 14C PRIOR ART
FIG. 14D PRIOR ART

IMAGE FORMING APPARATUS AND CONTROL METHOD FOR ROTATING IMAGE DATA BASED ON SHEET TYPE AND ORIENTATION

BACKGROUND OF THE INVENTION

1. Field of the Invention

The present invention relates to an image forming apparatus for forming images on sheets, a control method therefor, an image data output control method, and storage media storing programs for executing these methods.

2. Description of the Related Art

Conventional image forming apparatuses such as digital copiers output image data read by a scanner or the like, without changing the direction of the image data so that the output results are rotated through 180° as viewed from a user. This allows fast image processing but necessitates controlling of process positions in performing a punching process, a stapling process, and the like associated with the image processing.

FIGS. 14A to 14D are views showing how an image is processed starting with scanning of the original on an original table and ending with outputting of the image onto a recording sheet.

If an original with a character "あ" depicted thereon is placed on the original table in such a manner that the lower part of the original as viewed in FIG. 14A is closer to the user, while the upper part is closer to the original table, then the image data are read by scanning the original in the main scanning direction indicated by an arrow m and then in the subscanning direction indicated by an arrow s, as shown in FIG. 14B. Then, as shown in FIG. 14C, the read image data are written in a main direction indicated by an arrow m' and in a sub direction indicated by an arrow s', as shown in FIG. 14C and recorded in an image memory. Further, as regards the subscanning direction for the original, the direction in which a recording sheet is conveyed is normally opposite to the direction in which data are written onto the recording sheet. Accordingly, if the image data are read out from the image memory in the direction in which the data were written as shown in FIG. 14C, then the data are output onto the recording sheet with the main scanning direction indicated by an arrow m" and the subscanning direction indicated by an arrow s", as shown in FIG. 14D. As a result, the output image obtained is rotated through 180° with respect to the input original image as viewed from the user.

In this manner, the conventional image forming apparatuses can quickly output image data by aligning the direction in which the data are written onto the image memory with the direction in which the data are read out from the image memory.

Further, the image forming apparatuses of this kind have come to be able to handle not only plain paper, OHP sheets, and the like but also various types of recording sheets such as ones having image data previously printed thereon and ones already subjected to a punching process.

With the above described conventional image forming apparatuses, however, if recording sheets are directional or orientation, for example, if they have different image data previously printed thereon or have already been subjected to a punching process, and if an input image is output onto these recording sheets, then the output image obtained may have a direction or orientation different from that of the image data previously formed on the recording sheets or the punch holes obtained by the punching process are formed at a location different from a desired one. Consequently, the user's intended output results may not be obtained.

To avoid such a situation, if, for example, output sheets have any image previously printed thereon, the user himself must perform operations such as setting the recording sheets in the sheet feeding section in a predetermined direction taking the construction of the apparatus into consideration, or must intentionally rotate the output image before outputting it.

The above-mentioned operations, however, are very cumbersome to the user, and when the user himself must perform such cumbersome operations, he is likely to make a mistake in setting the sheets or operating the apparatus, thus failing to obtain desired output images.

For example, with an image forming apparatus having a punching process function, if an image is output onto a recording sheet with punch holes 51 already formed therein as shown in FIG. 15A, further punch holes 52 may be formed in the recording sheet with the punch holes 51 already formed therein, as shown in FIG. 15B, or the direction of the output image may not align with the direction of the punch holes, thus disadvantageously hindering an intended filing operation.

SUMMARY OF THE INVENTION

It is an object of the present invention to provide an image forming apparatus, a control method therefor, an image data output control method which have solved the above described problems, and storage media storing programs for executing these methods.

It is a specific object of the present invention to provide an image forming apparatus, a control method therefor, a method for controlling the output of image data which can obtain proper output results regardless of the type of recording sheets and which can obtain the user's desired output results without having the user perform cumbersome operations, and storage media storing programs for executing these methods.

To attain the above objects,s, in a first aspect of the present invention, there is provided an image forming apparatus including image input means to which image data are input, and image output means for outputting the image data input by the image input means to recording sheets as visible images, the image forming apparatus further comprising sheet type selecting means for selecting a particular one of a plurality of recording sheet types, image rotating means for rotating the image data through a predetermined angle, determining means for determining whether or not to rotate the image data by means of the image rotating means, based on contents of the selection executed by the sheet type selecting means, and control means for outputting the image data after rotating the image data through the predetermined angle if the determining means determines that the image data are to be rotated.

In a preferred form of the first aspect, the plurality of recording sheet types include a printed recording sheet which has already been printed, and if the sheet type selecting means selects the printed recording sheet, then the determining means determines that the image data are to be rotated, and the output control means outputs the image data after rotating the image data through the predetermined angle.

For example, the plurality of recording sheet types include a punched recording sheet already subjected to a punching process, and if the sheet type selecting means selects the punched recording sheet, then the determining means determines that the image data are to be rotated, and the output control means outputs the image data after rotating the image data through the predetermined angle.

More preferably, the image forming apparatus further comprises punching process means for executing the punching process on the recording sheets, and punching process instructing means for giving an instruction to execute the punching process on the recording sheets, and if the sheet type selecting means selects the punched recording sheet, the output control means inhibits the punching process means from executing the punching process and outputs the image data even if the punching process instructing means gives an instruction to execute the punching process.

In a further preferred form of the first aspect, the plurality of recording sheet types include a printed recording sheet which has already been printed, and a punched recording sheet already subjected to a punching process, and the image forming apparatus further comprises rotation instructing means for giving an instruction to rotate the image data through the predetermined angle, and if the sheet type selecting means selects the printed recording sheet or the punched recording sheet, the output control means outputs the image data after rotating the image data through the predetermined angle regardless of whether or not the rotation instructing means gives an instruction to rotate the image data.

Preferably, the predetermined angle is 180°.

Preferably, the image forming apparatus further comprises accumulating means for accumulating image data input by the image input means.

In a typical example of application of the invention, the image forming apparatus is connected to at least one external apparatus via a predetermined communication network, and the image input means receives image data input from the at least one external apparatus.

The external apparatus may comprise a facsimile machine, a printing apparatus which can describe data in a page description language, an image reading apparatus, and/or a personal computer.

To attain the above objects, in a second aspect of the present invention, there is provided an image data output control method that inputs image data and outputs the input image data to recording sheets as visible images, the method comprising a sheet type selecting step of selecting a particular one of a plurality of recording sheet types, an image rotating step of rotating the image data through a predetermined angle, a determining step of determining whether or not to rotate the image data based on the selected recording sheet type, and an output control step of outputting the image data after rotating the image data through the predetermined angle if it is determined at the determining step that the image data are to be rotated.

In a preferred form of the second aspect, the plurality of recording sheet types include a printed recording sheet which has already been printed, and if the printed recording sheet is selected as the recording sheet type, then the determining step determines that the image data are to be rotated, and the output control step outputs the image data after rotating the image data through the predetermined angle.

For example, the plurality of recording sheet types include a punched recording sheet already subjected to a punching process, and if the punched recording sheet is set as the recording sheet type, then the determining step determines that the image data are to be rotated, and the output control step outputs the image data after rotating the image data through the predetermined angle.

More preferably, the image data output control method further comprises a punching process step of executing the punching process on the recording sheets and a punching process instructing step of giving an instruction to execute the punching process on the recording sheets, and if the punched recording sheet is set as the recording sheet type, the output control step inhibits the punching process and outputs the image data even if an instruction to execute the punching process is given by the punching process instructing step.

More preferably, the plurality of recording sheet types include a printed recording sheet which has already been printed, and a punched recording sheet already subjected to a punching process, and the method further comprises a rotation instructing step of giving an instruction to rotate the image data through the predetermined angle, and if the printed recording sheet or the punched recording sheet is selected as the recording sheet type, the output control step outputs the image data after rotating the image data through the predetermined angle regardless of whether or not an instruction to rotate the image data is given by the rotation instructing step.

Preferably, the predetermined angle is 180°.

In a typical example of application of the second aspect, an image forming apparatus that implements the image data output control method is connected to at least one external apparatus via a predetermined communication network, and the image data are input from the at least one external apparatus.

To attain the above objects, in a third aspect of the present invention, there is provided a control method of controlling an image forming apparatus which forms an input image, comprising an image input step of inputting an image data, an image rotating step of rotating the input image data in response to a first instruction input by a user to execute a mode for rotating the image, an image forming step of an image of the rotated image data on a sheet, a determining step of determining a type of the sheet on which the input image is to be formed, and a control step of controlling the image rotating step to rotate the input image data regardless of whether or not the user has input the first instruction, when the type of the sheet determined by the determining step is a predetermined type, and then controlling the image forming step to form the image of the rotated image data on the sheet.

In a preferred form of the third aspect, the image forming apparatus can be connected to a sheet processing apparatus which can execute a sheet working process, and the image forming apparatus can control the sheet processing apparatus so as to execute the sheet working process in response to a second instruction input by the user to execute a mode for executing the sheet working process, and the control step controls the image rotating step to rotate the input image data regardless of whether or not the user has input the first instruction and inhibits the sheet processing apparatus from executing the sheet working process regardless of whether the user has a input the second instruction, when the type of the sheet determined by the determining step is the predetermined type.

To attain the above objects, in a fourth aspec of the present invention, there is provided a computer-readable storage medium storing a program for causing an image forming apparatus which forms an input image on a sheet, to execute an image input step of inputting an image data, an image rotating step of rotating the input image data in response to a first instruction input by a user to execute a mode for rotating the image, an image forming step of an image of the rotated image data on a sheet, a determining step of determining a type of the sheet on which the input image is to be formed, and a control step of controlling the image rotating step to rotate the input image data regardless of whether or not the user has input the first instruction, when the type of the sheet determined by the determining step is a predetermined type, and then controlling the image forming step to form the image of the rotated image data on the sheet.

The above and other objects, features and advantages of the present invention will be apparent from the following specification and drawings.

BRIEF DESCRIPTION OF THE DRAWINGS

FIGS. 10A to 10D are views useful in explaining how image data subjected to the rotating process are output onto a preprint sheet;

FIG. 12 is a view showing an example of a warning message displayed on the liquid crystal display of the operating section;

FIGS. 13A and 13B are views useful in explaining how image data subjected to the rotating process are output onto a prepunched sheet;

FIGS. 14A to 14D are views useful in explaining an example of the conventional problem.

DESCRIPTION OF THE PREFERRED EMBODIMENTS

The present invention will be described below with reference to the drawings showing preferred embodiments thereof.

Figure 1:
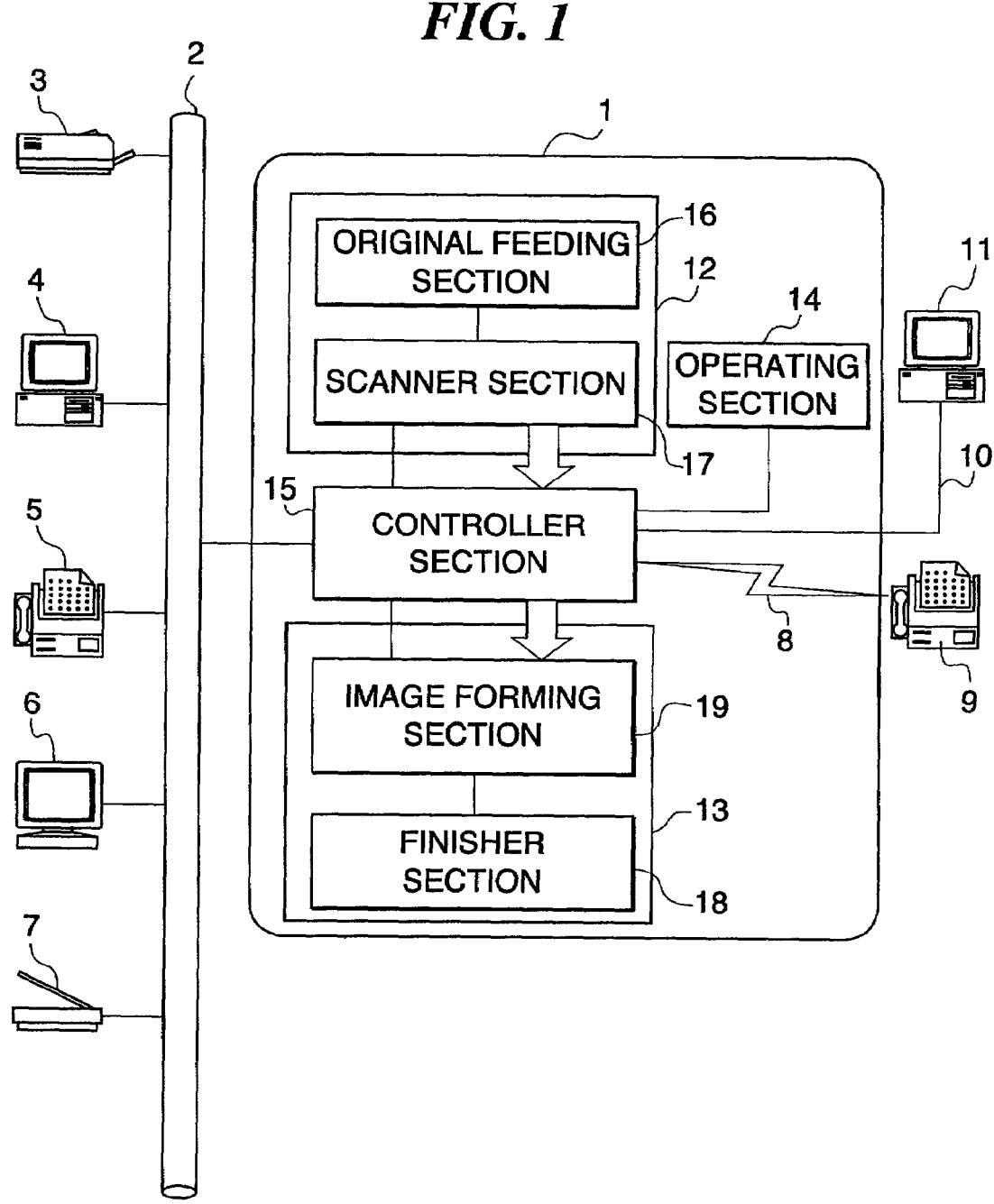
FIG. 1 is a block diagram showing the construction of an embodiment of an image forming apparatus according to the present invention.

FIG. 1 is a block diagram showing the construction of an image forming apparatus according to an embodiment of the present invention. The image forming apparatus 1 is connected to a plurality of electronic apparatuses (in the present embodiment, a network printer 3, a first personal computer 4, a first facsimile machine 5, a work station 6, and a network scanner 7) via a LAN (Local Area Network) such as an Ethernet, to a second facsimile machine 9 via a public telephone network 8, and to a second personal computer 11 via an exclusive I/F cable such as an RS232C, a centronics interface (I/F), an IEEE 1284, or a SCSI.

The image forming apparatus 1 is comprised of a reader section 12 for reading image data, a printer section 13 for outputting image data, an operating section 14 having a liquid crystal panel that, for example, displays image data or various functions and a touch panel or a keyboard attached to the liquid crystal panel, for allowing a user to perform operations of inputting and outputting image data, and a controller section 15 connected to these components to control the entire apparatus.

The reader section 12 is comprised of an original feeding section 16 for conveying originals, and a scanner section 17 for optically reading images from the originals and converting them into image data as electric signals. The printer section 13 is comprised of a finisher section for executing a sort or staple process on recording sheets with images formed thereon and an image forming section for transferring and fixing image data to the recording sheets.

Figure 2:
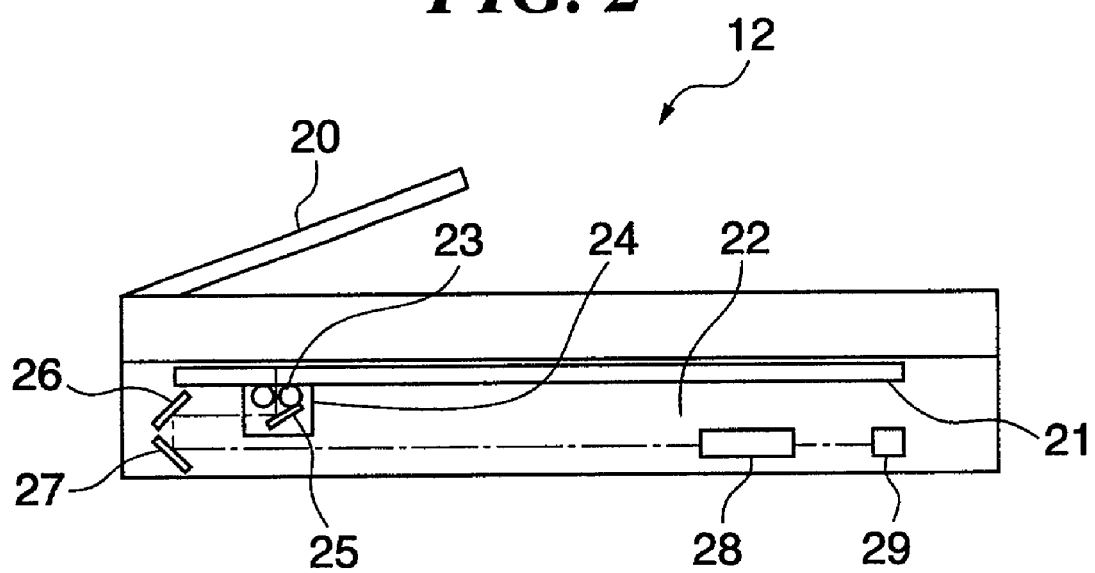
FIG. 2 is a view showing the internal construction of the image forming apparatus, particularly, a reader section, in detail.

FIG. 2 is a view showing the internal construction of the reader section 12, which employs an original fixing method as an original feeding method.

More specifically, in the reader section 12, original sheets accumulated on the original feeding section 20 are sequentially fed onto a platen glass 21 sheet by sheet in accordance with the order of the accumulation, starting with the uppermost sheet. After the scanner section 22 has completed a predetermined read operation, the original sheets from which data have been read are discharged from the platen glass 21 to the original feeding section 20.

Further, in the scanner section 22, when each original sheet is conveyed onto the platen glass 21, a lamp 23 is lighted and then an optical unit 24 is started to move and irradiate the original sheet with light from below for scanning. Light reflected from the original sheet is guided to a CCD image sensor (hereinafter simply referred to as "the CCD") 29 via a plurality of mirrors 25 to 27 and a lens 28, so that the scanned original image is read by the CCD 29. The image data read by the CCD 29 are subjected to a predetermined process and then transferred to the controller section 15.

Instead of feeding original sheets sheet by sheet, the original feeding section 20 may feed a plurality of originals onto the platen glass 21 at one time before the lamp 23 is lighted to read data from the originals.

In the present embodiment, the original fixing method is used as the original feeding method, but an original moving method may be employed. In this case, the lamp 23 of the scanner section 17 is lighted and the optical unit 24 moves to a predetermined location and then stops. While the optical unit 24 is moving, originals accumulated on the original feeding section 20 are sequentially fed onto the platen glass 21 sheet by sheet and then discharged therefrom. When each of the originals is fed onto the platen glass 21, the lamp 23, which is in stoppage at the predetermined location, is lighted to irradiate the moving original with light. Light reflected from the original is guided to the CCD 29 via the plurality of mirrors 25 to 27 and the lens 28.

Figure 3:
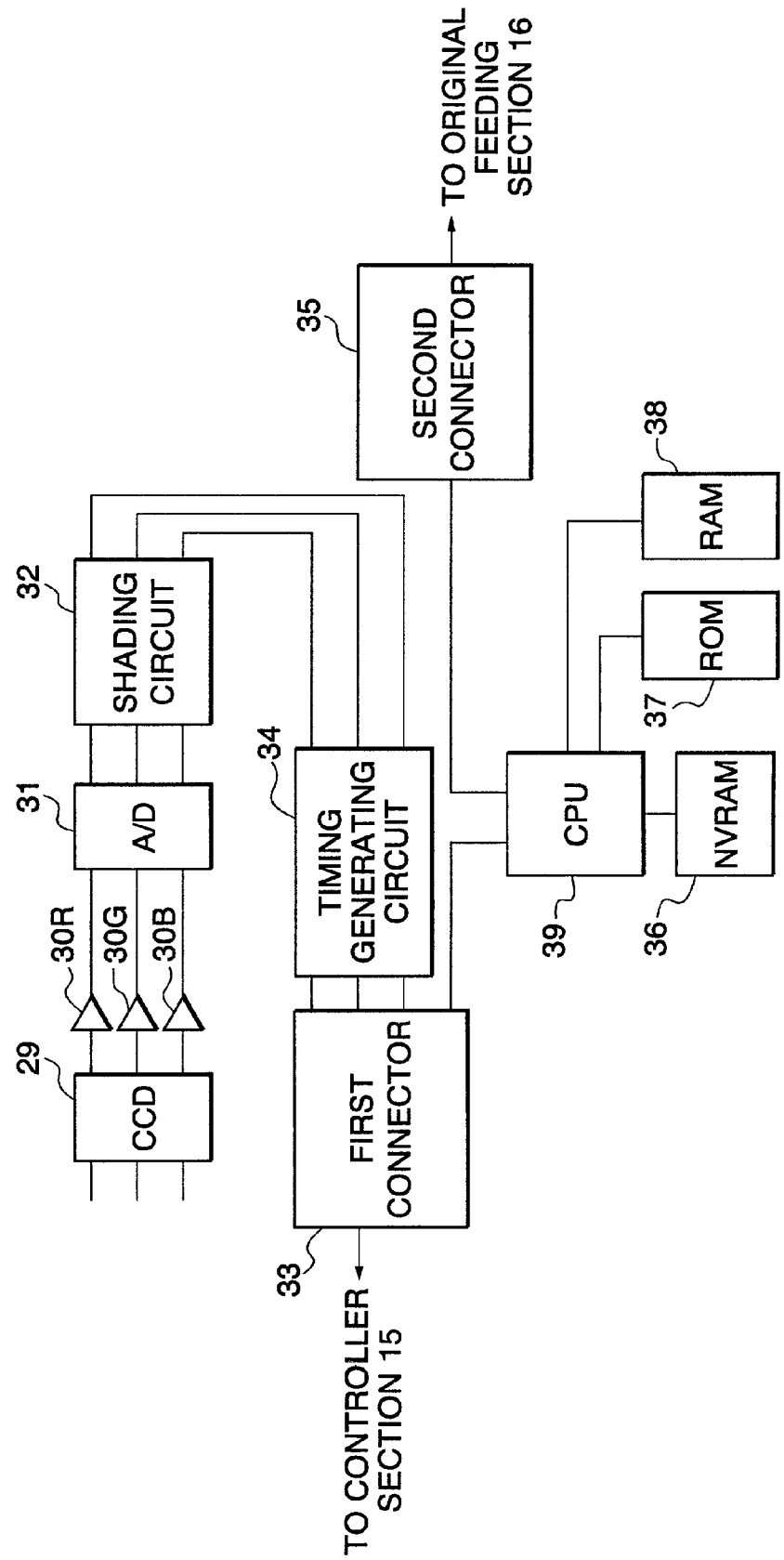
FIG. 3 is a block diagram showing the arrangement of a signal processing system of a scanner.

FIG. 3 is a block diagram showing the arrangement of a signal processing system of the scanner section 17. The signal processing system is comprised of amplifiers 30R, 30G, and 30B for amplifying color input information including R (red), G (green), and B (blue), an A/D converter 31 for converting the analog electric signals amplified by the amplifiers 30R, 30G, and 30B into digital electric signals, a shading circuit 32 for executing a predetermined shading process on the image data that have been converted into the digital electric signals by the A/D converter 31, a first connector 33 composed of a bidirectional asynchronous serial I/F and a video I/F and connected to the controller section 15, a timing generating circuit 34 for controlling drive timing for the optical unit 24, a second connector 35 connected to the original feeding section 16, an NVRAM (non-volatile memory) 36 storing information on the status of the reader section 12 and the like, a ROM 37 storing predetermined control programs, a RAM 38 for temporarily storing results of calculations or used as work areas, and a CPU 39 connected to these components to execute the above control programs and control the entire scanner section.

In the scanner section 17 comprised of such a signal processing system, color image data that have been converted into analog electric signals by the CCD 28 are amplified to a predetermined level by the amplifiers 30R, 30G, and 30B and then converted into digital electric signals by the A/D converter 31; the image data that have been converted into the digital electric signals are input to the shading circuit 32. The shading circuit 32 corrects non-uniformity of light distribution of the lamp 23 and non-uniformity of the sensitivity of the CCD 29. The controller section 13 determines whether or not to execute the correction of the non-uniformity of light distribution or non-uniformity of the sensitivity, and the result of the determination is supplied to the CPU 39. Thus, the operation of the shading circuit 32 is controlled by the CPU 39.

Further, the first connector 33 transmits and receives various control commands to and from the controller section 15, transmits and receives status information, and transfers images. More specifically, the controller section 15 requests, via the first connector 33, the CPU 39 to provide the status of the scanner section 17 or to transfer images, and the scanner section 17 transmits information on the status of the reader section 12 or information stored in the NVRAM 36, to the controller section 15.

The CPU 39 requests, via the second connector 35, the original feeding section 16 to feed originals, and the original feeding section 16 executes the control of a feeding motor, not shown, and the like in accordance with the request from the CPU 39 to perform the operation of feeding originals. The original feeding section 16 also transmits information on the status of its own or information stored in the memory thereof, to the scanner section 17.

The above-mentioned timing generating circuit 34 controls drive timing for a motor driver, not shown, actuated by control signals (HSYNC, HEN, VSYNC, and VEN) from the controller section 15 and which operates the optical unit 24 based on requests from the controller section 15.

Figure 4:
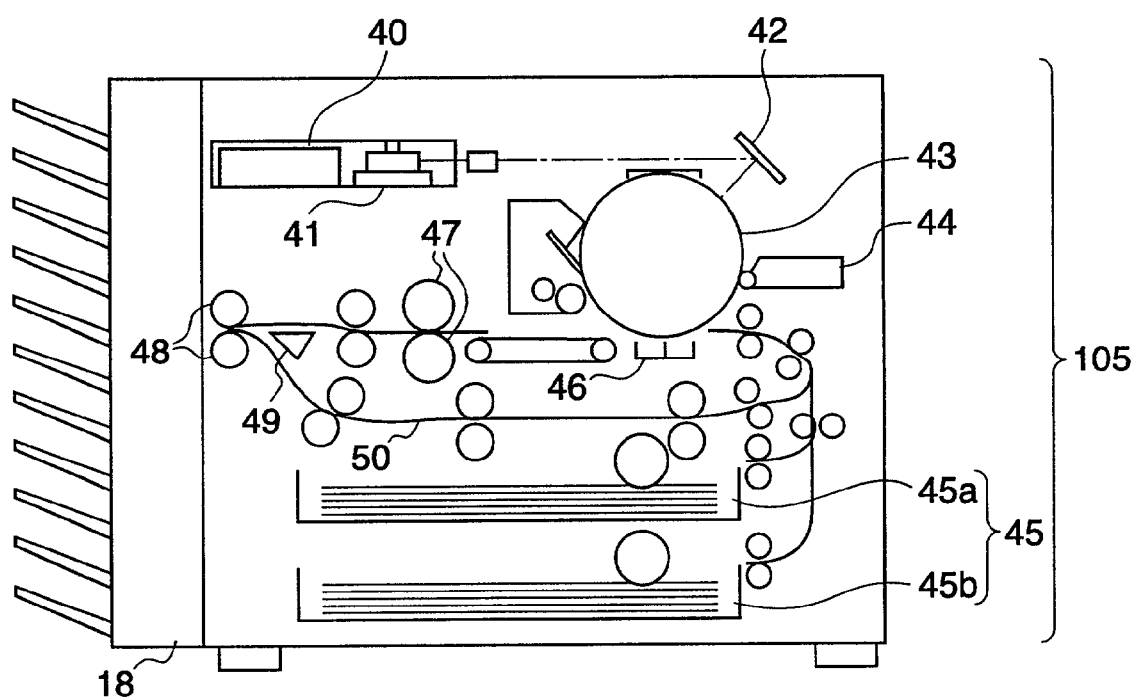
FIG. 4 is a view showing the internal construction of the image forming apparatus, particularly, a printer section, in detail.

FIG. 4 is a view showing the internal construction of the printer section 13.

In the printer section 13, laser light corresponding to image data output from the controller section 15 is emitted from a laser emitting section 41 driven by a laser driver 40. This laser light is applied to a photosensitive drum 43 via a mirror 42, an electrostatic latent image corresponding to the laser light is formed on the photosensitive drum 43, and a developing device 44 attaches a developer to the portion of the electrostatic latent image.

On the other hand, synchronously with the start of irradiation of laser light, a sheet feeding section 45 (first and second sheet feeding cassettes 45a and 45b) feeds and conveys recording sheets to a transfer section 46, where the developer attached to the photosensitive drum 43 is transferred to the recording sheets. The recording sheets with image data transferred thereto are conveyed to a fixing section 47, which executes a heating and pressurizing process to fix the image data to the recording sheets.

If the image data are to be recorded on only one side of the recording sheets, the recording sheets passing through the fixing section 47 are directly discharged to the finisher section 18, which then bundles and sorts the discharged recording sheets and staple the sorted recording sheets.

If the image data are to be recorded on both sides of the recorded sheets, the sheets are conveyed to a discharge roller 48, the rotating direction of which is then reversed to guide the sheets to a sheet refeeding transfer passage 50 by means of a flapper 49. The recording sheets guided to the sheet refeeding transfer passage 50 are conveyed to the transfer section 46 as described above.

Figure 5:
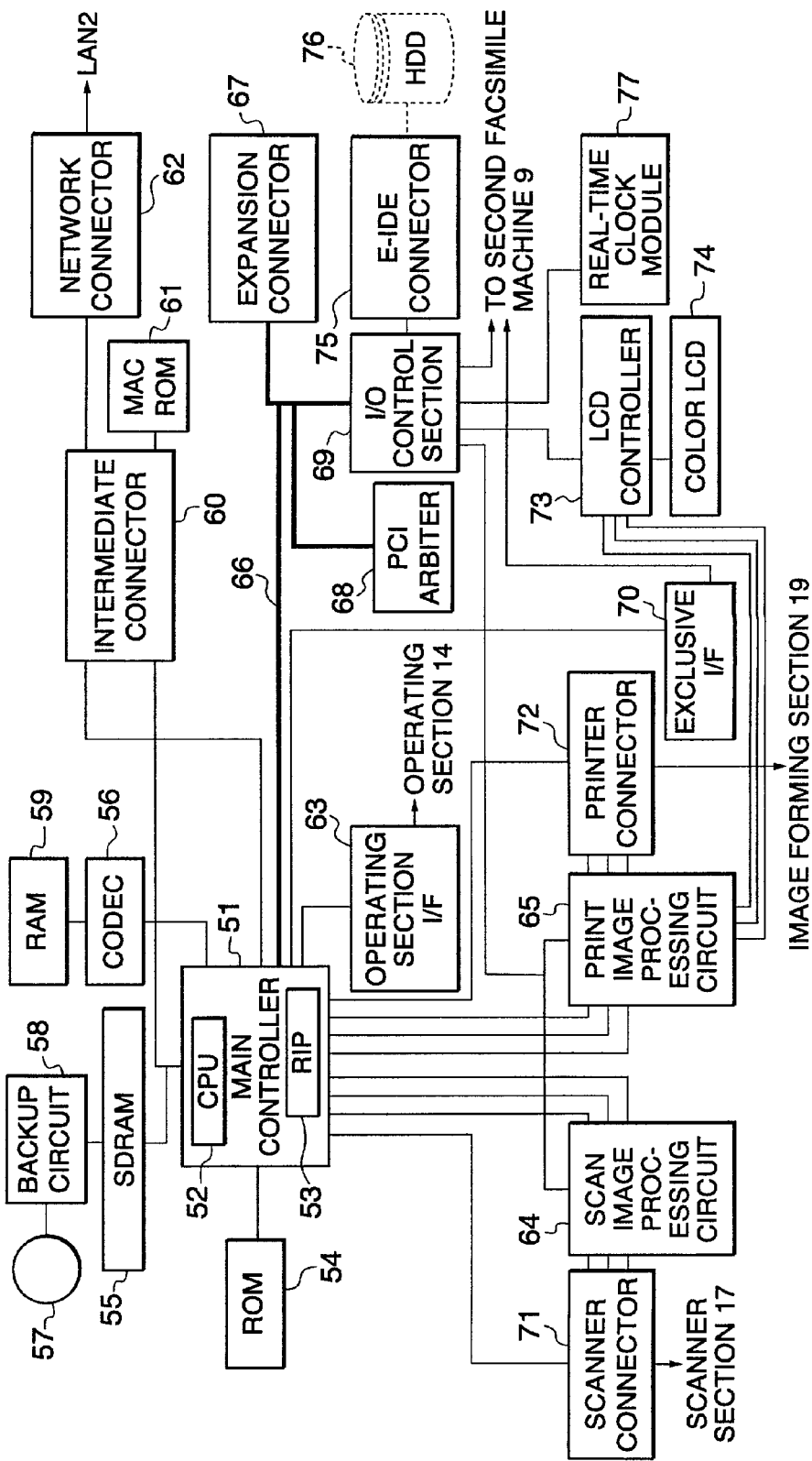
FIG. 5 is a block diagram showing the arrangement of a controller section in detail.

FIG. 5 is a block diagram showing details of the controller section 15.

A main controller 51 incorporates a CPU 52 and a RIP (Raster Image Processing) section 53 and is connected to a ROM 54, a SDRAM 55, a codec 56, and the like.

The ROM 54 stores various control programs executed by the CPU 52 as well as arithmetic data. The SDRAM 55 is used as work areas in which the CPU 52 operates or areas in which image data are accumulated, and stores various setting values required for the controller section 15 to operate as well as image data as required. The SDRAM is also connected to a backup circuit 58 supplied with a backup power from a secondary battery 57 so that the stored contents of the SDRAM 55 are backed up via the backup circuit 58 and the secondary battery 57 even if the power supply to the controller section 15 is interrupted, thereby preventing the stored contents of the SDRAM 55 from being lost.

The codec 56 acts as work areas to compress and expand image data. That is, the codec 56 transmits and receives image data to and from the SDRAM 55 via the main controller 51, compresses raster image data accumulated in the SDRAM 55, using a well-known compression method such as JPEG or JBIG, and expands the compressed data into the raster image data. The codec 56 further has not only the above-mentioned compression and expansion function but also the function of rotating image data; for example, the codec 56 can rotate binarized image data clockwise through 90°, 180°, or 270°.

The RIP section 53 of the main controller 51 expands a PDL format such as PS or PCL which is input to the controller section 15, in accordance with a corresponding instruction from the CPU 52, thereby converting it into an image format (bit map data) that can be output from the printer section 13 connected to the controller section 15.

The main controller 51 is connected to a MACROM 61, and a network connector 62 such as a 10/100 BASE-T, via an intermediate connector 60. The MACROM 61 stores physical addresses on a network, and the network connector 62 is connected to a LAN 2 to transmit and receive data to and from various electronic apparatuses on the LAN 2.

Further, the main controller 51 is connected to an operating section I/F 63, a scan image processing circuit 64, and a print image processing circuit 65, and further connected via a PCI bus 66 to an expansion connector 67 to which an expansion board can be connected, a PCI arbiter 68, and an I/O control section 69.

The operating I/F 63 is connected to the operating section 14 so that information input from the operating section 14 is supplied to the CPU 52 via the operating I/F 63. In accordance with instructions from the CPU 53, the operating I/F 63 also displays image data on a liquid crystal panel on the operating section 14 or displays various operation functions.

The I/O control section 69 is connected to the scan image processing circuit 64 and the print image processing circuit 65 to transmit and receives control commands to and from these circuits.

The PCI bus 66 is controlled through arbitration executed by the PCI arbiter 68 in the event of a bus contention and can transfer data to the PCI bus 66 via a PCI controller (not shown) incorporated in the CPU 52 so as to access the I/O control section 69 or communicate with other peripheral devices connected to the expansion connector 67.

Moreover, the main controller 51 has an exclusive I/F 70 connected thereto, which is further connected to the second facsimile machine 9.

The scan image processing circuit 64 is connected to a scanner connector 71, and the print image processing circuit 65 is connected to a printer connector 72.

The scanner connector 71 and the printer connector 72 have a bidirectional asynchronous serial I/F and a video I/F, and the scanner connector 71 is connected to the scanner section 17, while the printer connector 72 is connected to the image forming section 19. The CPU 52 transmits control commands to the scanner section 17 via the scanner connector 71 to request the scanner section 17 to transfer image data and receives the image data therefrom, and also transmits and receives control commands to and from the image forming section 19 via the printer connector 72 to transmit image data.

The scan image processing circuit 64 has image processing functions such as an RGB phase correcting function, an under-color removing function, a character determining function, an image converting function, a chromatic-color determining/counting function, a main-scanning variable power function, a binarizing function, and a contour and edge emphasizing function, and executes such image processing on image data transferred from the scanner section 17, under the control of the I/O control section 69. The scan image processing circuit 64 can also execute a mirroring process on image data in the main scanning direction and/or the subscanning direction to rotate the data through 180°.

The RGB phase correcting function comprises correcting deviation of the read phase (subscanning position) between color components of image data provided by the scanner section 17, the under-color removing function comprises removing under colors from images input from the scanner section 17, and the character determining function comprises determining edge areas of character/fine-line portions. Further, the image converting function includes the italics function of converting corresponding portions of images which are determined to be characters by the character determining function, into italics, the mirroring function of reversing images to obtain mirror images, the repeat function of outputting the same image a number of times, and other functions. Moreover, the chromatic-color determining/counting function comprises separating color characters from black characters to control character signals and determining whether the image data read by the scanner section 17 are monochrome or colored. The main-scanning-direction variable power function comprises varying the power in the main scanning direction for images input from the scanner section 17, and the binarizing function includes a simple binarizing function of binarizing multivalue signals at a fixed slice level, a binarizing function using a variable slice level varying depending on the values of pixels around a target pixel, and a binarizing function based on the error diffusion method.

The print image processing circuit 65 has image processing functions such as a main-scanning variable power function, a subscanning variable power function, a smoothing function, and thickening function, and executes image processing under the control of the I/O control section 69 and transfers image data to the image forming section 19 via the printer connector 72. That is, the printer image processing circuit 65 can output desired image data for printing by executing relevant processing to obtain optimal images that can be output by the image forming section 19, requests the image forming section 19 to output the image data, and transfers the image data to the image forming section 19. Similarly to the scan image processing circuit 64, the print image processing circuit 65 can execute a mirroring process on image data in the main scanning direction and/or the subscanning direction to rotate the data through 180°.

Further, the I/O control section 69 is connected to an LCD controller 73, to which a color liquid-crystal display device 74 can be connected. The color liquid-crystal display device 74 can display image data processed by the print image processing circuit 65.

Furthermore, the I/O control section 69 is connected to an HDD 76 via an E-IDE connector 75 and also connected to a real-time clock module 77 for updating/saving dates and times managed in the related apparatuses. The HDD 76 is a massive non-volatile storage device in which a plurality of applications and/or image data required for the CPU 52 to operate are stored.

Next, a description will be given of a process which forms image data input from an image source such as the scanner 7, the PC 6, or the facsimile machine 5 on sheets (hereinafter referred to as "the preprint sheets") with a certain image previously formed thereon at a predetermined location thereof, such as sheets with a company logo previously printed at a predetermined location thereof (for example, an upper right location of the sheets). In the present embodiment, the image from the above image source is formed in a print area which is different from the above predetermined location.

Figure 6:
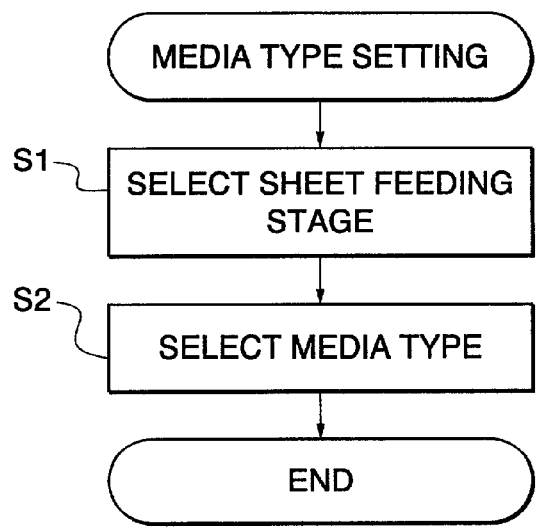
FIG. 6 is a flow chart showing the procedure of a media type setting process.
Figure 8:
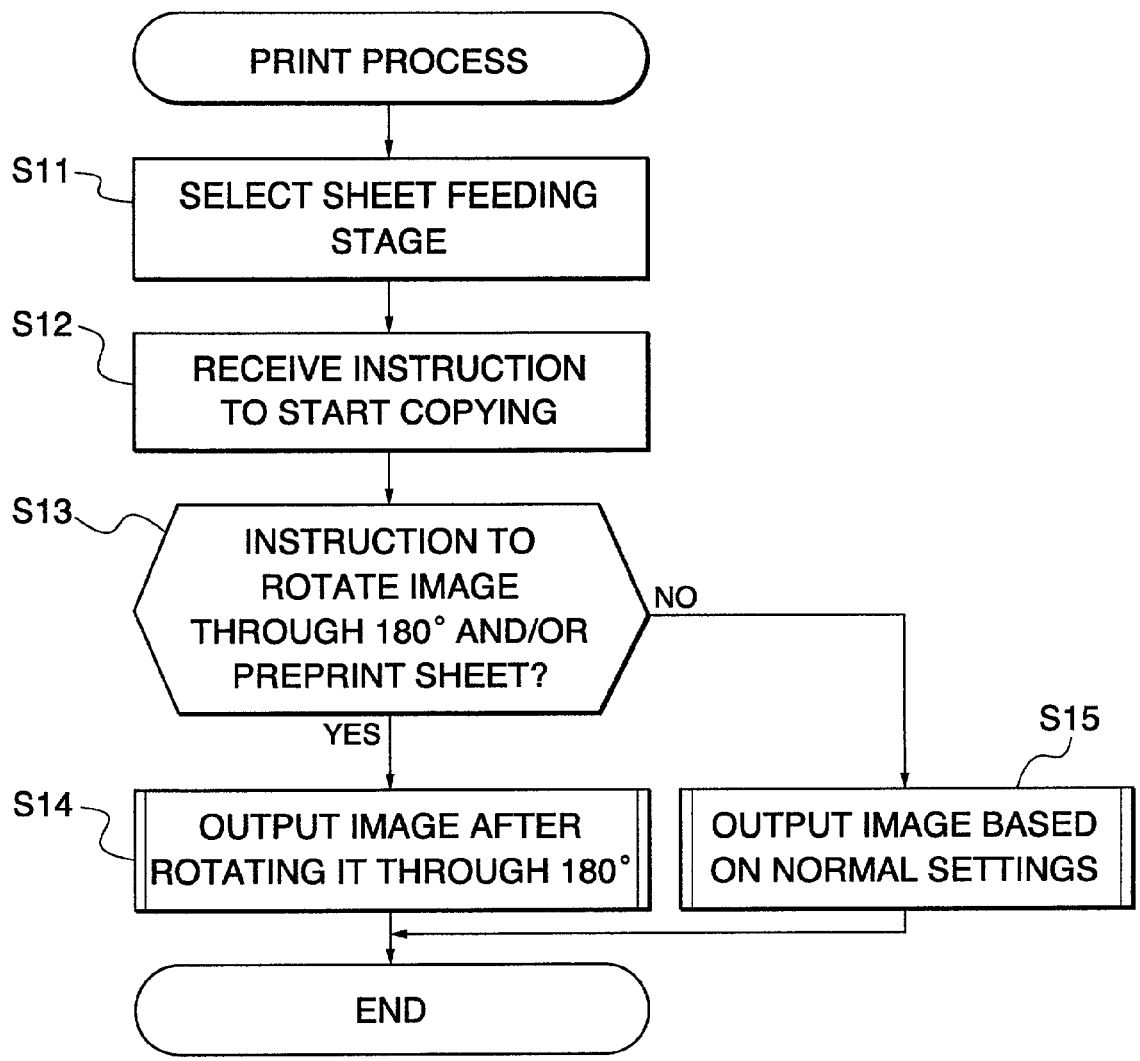
FIG. 8 is a flow chart showing the procedure of a printing process.
Figure 11:
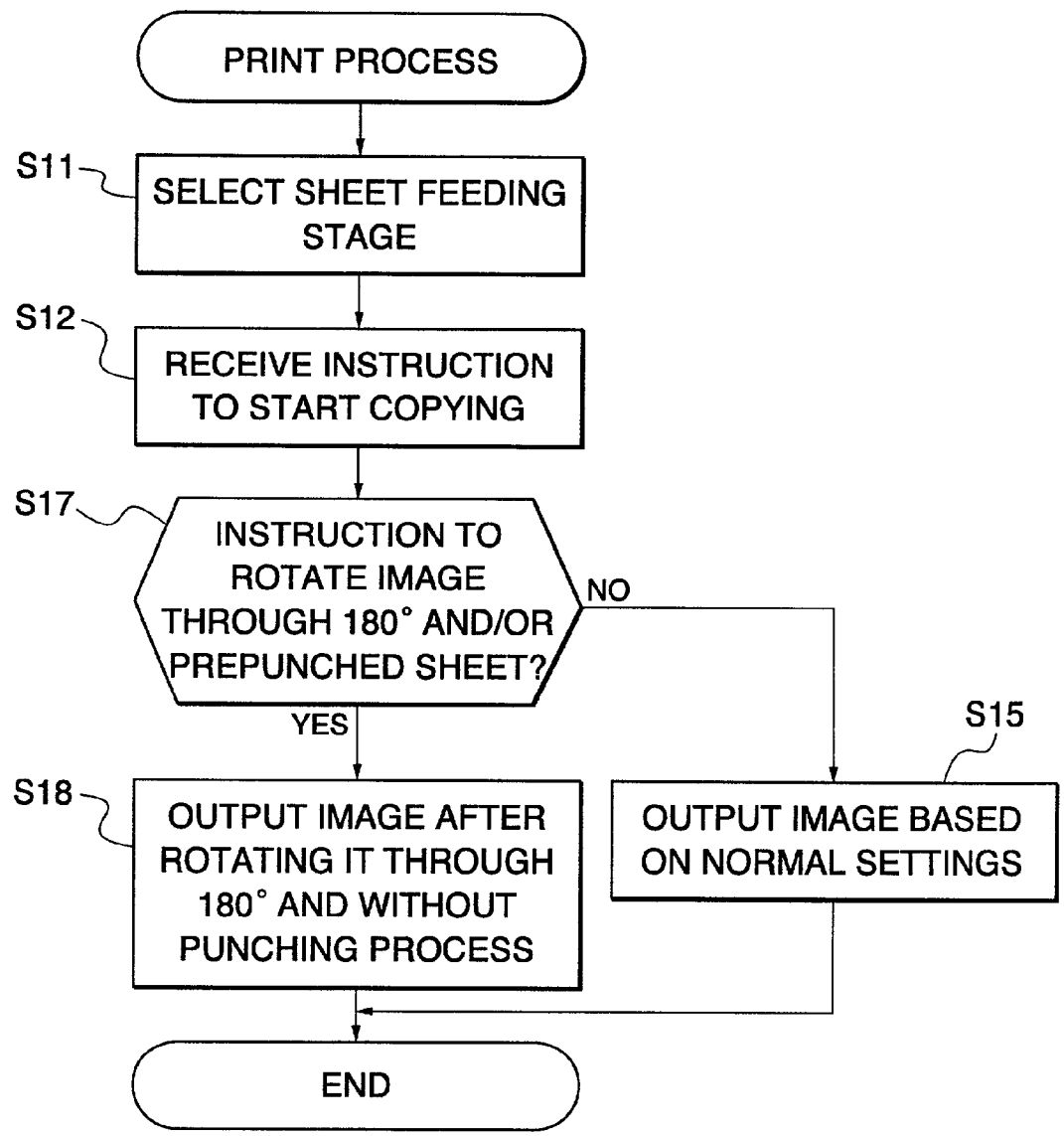
FIG. 11 is a flow chart showing the procedure of the printing process according to another embodiment of the present invention.

Various processes of the present embodiment including ones shown in the flow charts of FIGS. 6, 8, and 11 are executed by the CPU 52 of the controller section 15 by reading and executing programs from the ROM 54 in which corresponding program codes for executing the above various processes are stored.

FIG. 6 is a flow chart showing the procedure of a process for setting a media type (the type of recording sheets). At a step S1, the user selects a sheet feeding stage on which recording sheets are to be set. That is, the user first selects one of the sheet feeding cassettes in the sheet feeding section 45 of the image forming section 19 and sets preprint sheets in this sheet feeding cassette (in the present embodiment, the user is assumed to select the first sheet feeding cassette 45*a*).

The preprint sheets are normally accommodated in the first cassette 45*a* in such a manner that their top is located on the inner side of the printer.

Further, in a normal printing mode, the printer section 13 (image forming section 19) prints image data on the back side of recording sheets fed from the first sheet feeding cassette 45*a*. Accordingly, the preprint sheets are set in the first sheet feeding cassette 45*a* such that the image data are printed on the back side of the sheets.

Figure 7:
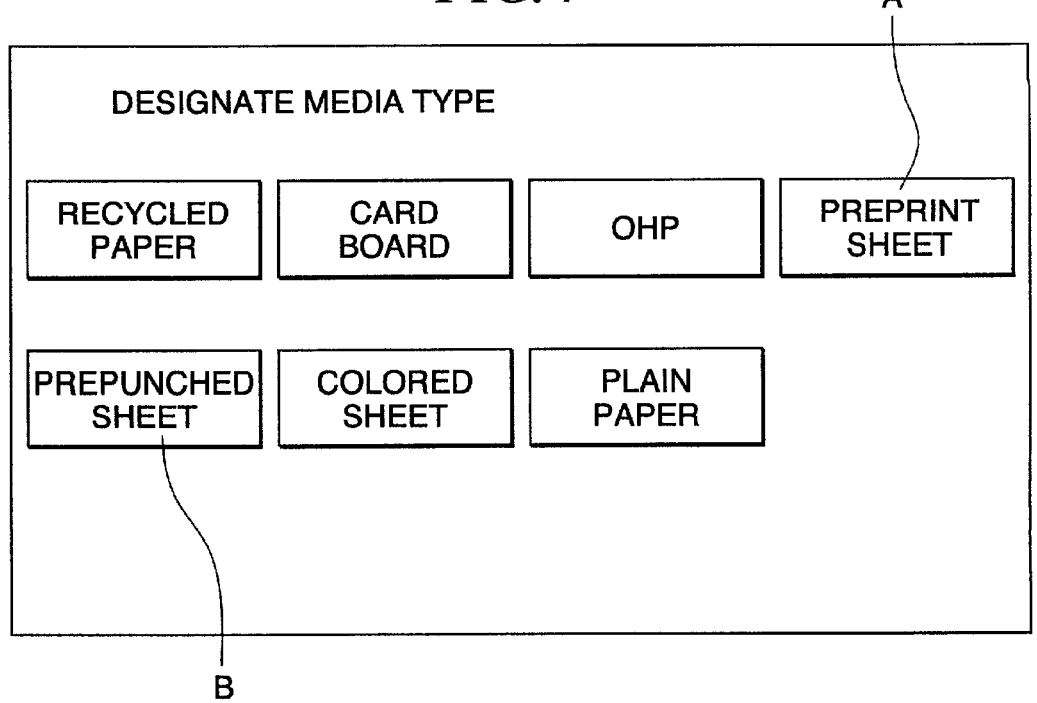
FIG. 7 is a view showing an example of a display on a liquid crystal display of an operating section.

Then, at a step S2, a media type is selected and set. That is, before a print process is started, various media types are displayed on the liquid crystal panel of the operating section 14, as shown in FIG. 7. The user thus depresses a "preprint sheets" button (indicated by a symbol A in FIG. 7) on the liquid crystal panel to select the preprint sheets as the media type to thereby complete the process for setting the media type.

In the present embodiment, the user can designate the type of sheets (in the present embodiment, this is referred to as "the media type") for each sheet feeding cassette, on the operation screen shown in FIG. 7, or the like. The user thus performs input operations such as the designation of the type of sheets for each sheet feeding port, on an operation screen such as the one shown in FIG. 7, to subsequently obtain information on the sheet type for each sheet feeding cassette and store the information on the type of sheets for each sheet feeding cassette in a memory (for example, the SDRAM 55) in the controller section 15 for management. The CPU 52 of the controller section 15 can determine the sheet type for each sheet feeding cassette by reading out and referencing the information on the sheet type for each sheet feeding cassette stored in the above memory, as required. Further, the sheet type may be determined using a sensor, for example, by providing a reflection-type optical sensor (not shown) or the like for each sheet feeding port so that the sheet type can be determined based on the reflectance detected by the sensor. Moreover, information on the size (in the present embodiment, this is referred to as "the media size") of the sheets set in the sheet feeding cassette may be input by the user from the operating section or obtained by a sensor through size detection.

In this manner, the image forming apparatus of the present embodiment separately manages the media type and the media size and based on this management, executes various processes including the one shown in the flow charts of FIGS. 8 and 11, described later.

Further, the present embodiment is adapted to form images on various types of sheets including special ones as shown in FIG. 7. Referring to the operation screen in FIG. 7, for example, the "card board" is a sheet which is sturdy and thicker than typical or ordinary ones and which are used for covers or interleaved sheets for bookbinding, the "prepunched sheet" has already undergone a punching process at a predetermined location (sewing location) and requires no punching process executed by a device such as a punch unit, the "colored sheet" is used, for example, to clarify the boundary between Chapters 1 and 2, for example, during bookbinding, and the "preprint sheet" has an image previously formed at a predetermined location as described above. In the present embodiment, the user sets sheets of one of these types in the sheet feeding cassette and designates and inputs, on the operation screen, the type of the sheets set in the sheet feeding cassette. Then, the CPU 52 of the controller section 15 determines the type of the sheets on which images are to be formed, to execute an optimal process. This will be described below with reference to the process shown in the flow chart, described later.

FIG. 8 is a flow chart showing a manner of controlling the output of image data.

At a step S11, the user operates the operating section 14 to select a sheet feeding stage for a print process (in the present embodiment, the first sheet feeding cassette 45a with preprint sheets set therein is selected).

Then, at a step S12, the user operates the operating section 14 to instruct the image forming apparatus 1 to start copying, and at a step S13, determines whether or not a 180° rotation mode for rotating image data through 180° is set and/or whether or not preprint sheets are used for recording. That is, the user reads the media type setting for the first sheet feeding cassette 45a out from the SDRAM 55 and further determines whether the 180° rotation mode has already been designated during another mode selection. The 180° rotation mode is also referred to as "the image orientation preferred mode"; if the user desires to avoid that the output results as the original image data are rotated through 180° with respect to the orientation or direction of the original as viewed from the user, the user gives an instruction to rotate the image through 180° by expressly operating the operating section 18. That is, in a normal image forming mode, the image forming apparatus forms an original image having an orientation different by 180° from that of the image on the original set on the original table (the output results are rotated through 180° with respect to the orientation of the original). The 180° rotation mode thus inhibits the formation, on the sheet, of an image having an orientation different from that of the input original image by 180°, that is, rotates an image input from the image source such as the scanner, through 180° to form a rotated image on the sheet, in order to form the original image having the same direction as that set on the original table (the output results have the same direction as the original). In the present embodiment, the user can input an instruction to select such a mode, via the operation screen (not shown) displayed on the operating section 14.

In addition to the above described settings, the user can select and designate, on the operation screen (not shown) displayed on the operating section 14, a sheet processing mode such as a staple process mode for stapling the sheets using a stapler provided in a sheet processing device such as the finisher or a punching process mode for punching the sheets using the punch unit.

Then, if the answer at the step S13 is "No", the procedure proceeds to a step S15 to output the image based on normal settings. On the other hand, if the answer at the step S13 is "Yes", that is, the media type is set to the preprint sheets and/or the 180° rotation mode is set, then the image data are rotated through 180° and then output to complete the process.

As described above, in the present embodiment, the preprint sheet has an image previously formed thereon (that is, the preprint sheet is directional or orientation). In order to avoid the formation, on the preprint sheet, of an image having an orientation different from that of the previously formed image, the image forming direction of the input image to be formed on the preprint sheet is determined based on the direction of the image previously formed on the preprint sheet, so that the image is rotated depending on the result of the determination and the rotated image is formed on the sheet (that is, in the present embodiment, by rotating the image through 180° before forming it on the sheet, the orientation of the image previously formed on the preprint sheet can be aligned with the orientation of the input image).

Thus, since the type of the sheet on which the image is to be formed is the preprint sheet, control is provided such that regardless of whether or not the user has input, via the operating section 14, an instruction to execute a mode for rotating the image, such as the 180° rotation mode in the present embodiment, for example, before executing the image forming process on the sheet, the input image is automatically rotated depending on the orientation of the image previously formed on the preprint sheet, so that the rotated image is formed on the sheet.

In the present embodiment, it is possible to cause an external apparatus such as the PC 6 to output the image and form it on the sheet. Thus, the user may be able to input the designation of the type of sheets for each sheet feeding cassette and an instruction to execute an image rotating mode such as the 180° rotation mode, via an operating screen displayed on a CRT of the external apparatus such as the PC so that the image forming apparatus can make various settings based on these designation and instruction data from the external apparatus. In this case, since the type of the sheet on which the image from the above external apparatus is to be formed is the preprint sheet, control is also provided such that regardless of whether or not the user has input an instruction to execute the above-mentioned image rotating mode on the above external apparatus, the input image is automatically rotated depending on the orientation of the image previously formed on the preprint sheet, so that the rotated image is formed on the sheet.

The above process for rotating the image data can be executed by the codec 56, the scan image processing circuit 64, or the print image processing circuit 65.

A description will be given of a manner of rotating and outputting an image using the codec 56 in the case where the character"あ" is to be printed on a preprint sheet with the characters "Confidential" already printed at the bottom of this recording sheet.

First, the CPU 52 instructs the reader section 12 to load an original image via the scanner connector 71. Upon receipt of this load instruction, the reader section 12 scans the original and inputs the image. The input image data are loaded into the SDRAM 55 via the scan image processing circuit 64 under the control of the CPU 52.

Figure 9C:
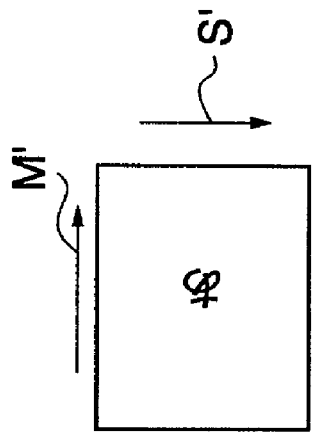
FIGS. 9A to 9E are views useful in explaining a process for rotating image data.
Figure 9E:
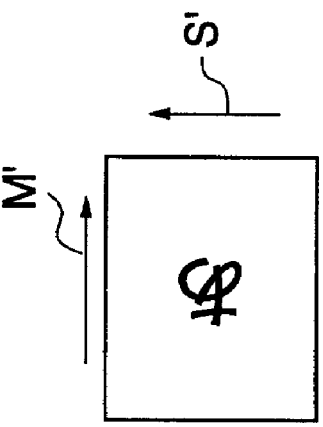
Figure 9B:
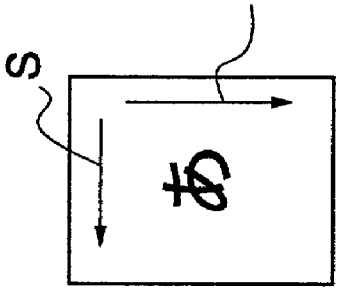
Figure 9D:
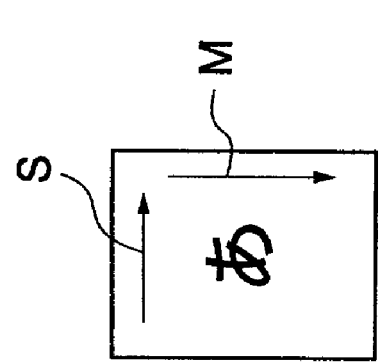
Figure 9A:
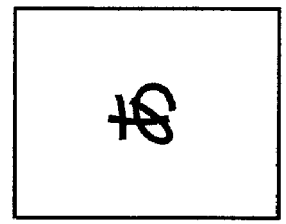

At this time, as shown in FIG. 9A, the original is arranged on the platen glass 21 in such a manner that the top of the character "あ" is located in the upper part (the part which is closer to the inner side of the printer) of the platen glass 21.

If the original fixing method is used as the original feeding method or if the original feeding section 20 is not provided, and the original image is read by pressing the original against the table using a pressure plate, then the image is scanned in the main scanning direction shown by an arrow M and the subscanning direction shown by an arrow S, as shown in FIG. 9B. Consequently, the input image is directly written to the SDRAM 55, as shown in FIG. 9C (in the figure, symbol M' denotes the main scanning direction for writing in the memory and symbol S' denotes the subscanning direction for writing in the memory).

If the original moving method is used as the original feeding method, the data are loaded in the subscanning direction S which is opposite to that in the original fixing method, as shown in FIG. 9D. Thus, when the data are written to the SDRAM 55, the scan image processing circuit 64 mirrors the subscanning direction so that the data are written to the SDRAM 55 in the opposite subscanning direction S', as shown in FIG. 9E.

The image data thus loaded are stored in the SDRAM 55 in the same write direction as that of the original irrespective of the type of the original feeding method.

Then, the CPU 52 ascertains that the image data have been completely loaded in the SDRAM 55, and then rotates the image based on a hardware algorithm specification. The algorithm for the rotating process is arbitrary. In the present embodiment, the image undergoes only the 180° rotation.

On the other hand, the output of the image data starts when the CPU 52 gives an instruction to the image forming section 19 via the printer connector 72.

That is, first, in response to the instruction from the CPU 52, the image forming section 19 conveys a preprint sheet such as one shown in FIG. 10A, from the first sheet feeding cassette 45*a*.

Then, in the image forming section 19, a laser beam is scanned on the photosensitive drum 43 from the outer side toward the inner side thereof to draw an image on the drum 43, so that an image such as one shown in FIG. 10C is obtained; the image is reversed through 180° compared to the one printed on the preprint sheet.

Thus, in the present embodiment, the image data of the form shown in FIG. 10D is obtained by causing the CPU 52 to recognize that this is an output to the preprint sheet before rotating the image on the SDRAM 55 through 180° using the codec 56, as described above.

As described above, in this first embodiment, when an image is output to a directional recording sheet such as the preprint sheet, the loaded image is rotated through 180° to obtain an image output in which the direction of a previously printed image corresponds to the direction of the newly printed image.

FIG. 11 is a flow chart showing a manner of controlling the output of image data according to a second embodiment of the present invention. In the second embodiment, image data are printed on a sheet (hereinafter referred to as "the prepunched sheet") previously subjected to a punching process.

First, the user sets prepunched sheets in the sheet feeding section 45, for example, the first sheet feeding cassettes 45*a*, selects a "prepunched sheet" button (indicated by symbol B in FIG. 7) displayed on the liquid crystal panel in FIG. 7, and then selects a sheet feeding stage (step S11) and gives an instruction to start copying (step S12) in the same manner as in the first embodiment. Then, at a step S17, the user determines whether or not the 180° rotation mode is set and/or prepunched sheets are set in the sheet feeding cassette and whether or not a punching process mode is set. In this regard, the punching process mode refers to the function mode of instructing the finisher 18 to execute a punching process.

Then, if the answer at the step S17 is "No", the image is output based on normal settings. On the other hand, if the answer is "Yes" and the punching process mode is designated in spite of the presence of the prepunched sheets, a warning message "Punching Process Not Executed on Prepunched sheets" is displayed on the liquid crystal panel of the operating section 14, as shown in FIG. 12. Then, the procedure proceeds to a step S18 to rotate the image through 180° and output the image data without executing any punching process, thus completing the process.

Figure 15A:
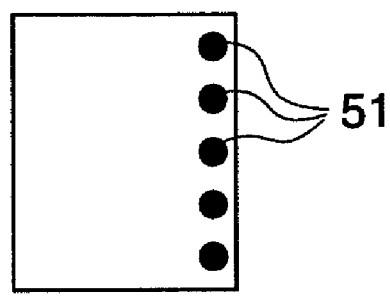
FIGS. 15A and 15B are views useful in explaining an example of the conventional problem.
Figure 15B:
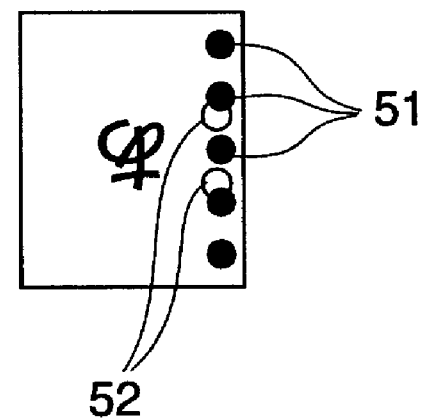

That is, as in the first embodiment, the codec 56 is used to rotate the image through 180°. Since the CPU 52 recognizes that the image should be output without punching the sheet, the image forming section 19 does not command punching. This serves to prevent the formation of unwanted punch holes as discussed in the conventional example (see FIG. 15) and enables a desired image output to be obtained as shown in FIG. 13B.

As described above, in this second embodiment, since the prepunched sheet has been already subjected to the prepunching process, a sheet working process such as the punching process (including the staple process) is inhibited from being executed on this prepunched sheet (for example, the function button displayed on the operating section and corresponding to this sheet working process is disabled). Alternatively, for example, the operation of the punch unit or the stapler is inhibited because the image forming apparatus of the present embodiment can be connected to (or may be incorporated in) a sheet processing unit that can execute a sheet working process such as the one described above). Further, since this prepunched sheet is directional due to the presence of the punch holes, in order to avoid an improper relationship between the punch holes (that is, the binding position) on the prepunched sheet and the location of the input image as in the prior art, the direction in which the input image is to be formed on the prepunched sheet is determined based on the arrangement on this sheet (the left side, top, bottom, or right side of the sheet) of the binding position previously formed on the prepunched sheet, and the image is rotated depending on the result of the determination, so that the rotated image is formed on the sheet (that is, in the present embodiment, by executing the 180° rotation process before forming the image on the sheet, the input image can be formed in an optimal orientation depending on the arrangement of the punch holes previously formed in the prepunched sheet).

Accordingly, since the type of the sheet on which the image is to be formed is the prepunched sheet, control is also provided such that regardless of whether or not the user has input an instruction to execute a mode for rotating the image, such as the 180° rotation mode in the present embodiment, for example, before executing the image forming process on the sheet, the input image is automatically rotated depending on the locations on this prepunched sheet of the punch holes previously formed in the prepunched sheet, so that the rotated image is formed on the sheet.

In the present embodiment, it is possible to cause an external apparatus such as the PC 6 to output an image and form it on the sheet. Thus, the user may be able to input the designation of the type of sheets for each sheet feeding cassette and an instruction to execute an image rotating mode such as the 180° rotation mode, via an operating screen displayed on a CRT of the external apparatus such as the PC so that the image forming apparatus can make various settings based on these designation and instruction data from the external apparatus. In this case, since the type of the sheet on which the image from the above external apparatus is to be formed is the prepunched sheet, control is also provided such that regardless of whether or not the user has input an instruction to execute the mode for the sheet working process, the sheet working process is inhibited from being executed on the prepunched sheet and such that regardless of whether or not the user has input, on the above external apparatus, an instruction to execute the above-described image rotation mode, the input image is automatically rotated depending on the locations on the prepunched sheet of the punch holes previously formed on the prepunched sheet, so that the rotated image is formed on the sheet.

Thus, in the second embodiment, the loaded image is output after being rotated through 180°, so that even if the image data are output to a directional recording sheet such as the prepunched sheet, the prepunched sheet already having the punch holes formed therein is prevented from being punched again, and in the output image, the direction of the image data and the locations of the punch holes are as intended by the user, thereby making it possible to obtain a desired output image.

Further, as described above, in the present embodiment, the media type and the media size are separately managed in executing various kinds of control as described in the first and second embodiments.

That is, for example, in the case where the image forming apparatus of the present embodiment automatically determines the size of recording sheets to be used, based on the input image data or where the user designates the size of recording sheets, the size (media size) of recording sheets to be actually used is assumed to be, for example, A4. Then, if the type (media type) of the A4-sized recording sheets to be actually used is one different from the preprint or prepunched sheet, not the above-described control but the normal control is executed (for example, the image is rotated if the 180° rotation mode is set, or the image is not rotated if the 180° rotation mode is not set). On the other hand, if the media type is the preprint or prepunched sheet, the above described control is executed.

Thus, in the present embodiment, the media type and the media size are separately managed and controlled. Accordingly, regardless of the size of the recording sheet on which the image is to be actually formed, control is provided so as to determine whether or not to rotate the image and to execute the sheet working process (punching process or the like), depending on the type of the recording sheets, so that even if the recording sheets are of the same size but if they are of different types, they are differently controlled depending on their types.

Further, programs for realizing the processes (functions) used by the above described embodiments are stored in the ROM 54 as program codes, which are read out by the CPU 52 to execute the functions. However, it goes without saying that these functions may be accomplished by supplying a system or an apparatus with a storage medium in which program codes of software for realizing the functions of the above described embodiments are recorded, and causing a computer (or CPU or MPU) of the system or apparatus to read out and execute the program codes stored in the storage medium.

In this case, the program codes themselves read out from the storage medium realize the functions of the above described embodiments, so that the storage medium storing the program codes constitutes the present invention.

The storage medium for supplying the program codes may be selected from, for example, a floppy disk, hard disk, optical disk, magneto-optical disk, CD-ROM, CD-R, magnetic tape, non-volatile memory, and ROM.

It also goes without saying that the functions of the above described embodiments may be achieved not only by executing program codes read out by a computer, but also by causing an operating system (OS) that operates on the computer to perform a part or the whole of the actual operations according to instructions of the program codes.

Furthermore, it is to be understood that the program codes read out from the storage medium may be written to a memory provided in an expanded board inserted in the computer, or an expanded unit connected to the computer, and a CPU or the like provided in the expanded board or expanded unit may actually perform a part or all of the operations according to the instructions of the program codes, so as to accomplish the functions of the above described embodiments.

As described above in detail, according to the present invention, even if the recording sheets are directional, the user can output a desired image without being conscious of the construction of the image forming apparatus. In particular, even if the image is to be output to recording sheets already subjected to the punching process, the sheet is prevented from being punched again, thereby making it possible to obtain output results as intended by the user. Therefore, proper output results can be obtained regardless of the type of the recording sheets, and the user's desired output results can be obtained without having the user perform cumbersome operations.

What is claimed is:

1. An image forming apparatus including an image input unit adapted to input image data, and an image output unit adapted to record an image based on the image data to a recording medium, the image forming apparatus further comprising:

a selector adapted to select a recording medium required for a job to be processed from candidates of a plurality of recording media including a recording medium of a first size and a first type and a recording medium of the first size and a second type which is not the same as the first type; and a controller adapted to cause said output unit to record an image which is rotated in a predetermined angle to a recording medium of the first size and the first type, in a case where said job to be processed requires the recording medium of the first size and the first type, and cause said output unit to record an image which is not rotated in the predetermined angle to a recording medium of the first size and the second type, in a case where said job to be processed requires the recording medium of the first size and the second type, wherein the recording medium of the first type is a punched recording medium which has been already subjected to a punching process, and wherein if said selector selects the punched recording medium, said controller causes said output unit to record the image based on the image data after rotating the image data by the predetermined angle on the punched recording medium.

2. An image forming apparatus according to claim 1, further comprising punching process unit adapted to execute a punching process to a recording medium, in a case where an instruction to execute me punching process to the recording medium is input, and wherein if said selector selects the punched recording medium, said controller inhibits execution of the punching process by said punching process unit and allows execution of recording of the image by said output unit.

3. An image forming apparatus according to claim 1, wherein said controller causes said output unit to record said image which is rotated in said predetermined angle on the recording medium, in a case where an instruction to rotate the image data to the predetermined angle is input, and wherein if said selector selects at least one of the printed recording medium or a punched recording medium, said controller causes said output unit to record said image which is rotated in said predetermined angle on the recording medium regardless of an input of the instruction.

4. An image forming apparatus according to claim 1, wherein the predetermined angle is 180°.

5. An image forming apparatus according to claim 1, further comprising a store unit adapted to store image data input by said image input unit.

6. An image forming apparatus according to claim 1, wherein the image forming apparatus is connected to at least one external apparatus via a predetermined communication unit, and said image input unit receives image data input from the at least one external apparatus.

7. An image forming apparatus according to claim 6, wherein said at least one external apparatus comprises at least one facsimile machine.

8. An image forming apparatus according to claim 6, wherein said at least one external apparatus comprises at least one printing apparatus which describes data in a page description language.

9. An image forming apparatus according to claim 6, wherein said at least one external apparatus comprises at least one image reading apparatus.

10. An image forming apparatus according to claim 6, wherein said at least one external apparatus comprises at least one personal computer.

11. An image data output control method for an image output apparatus which includes an image output unit adapted to record an image based on image data to a recording medium, the method comprising the steps of:

selecting a recording medium required for a job to be processed from candidates of a plurality of recording media including a recording medium of a first size and a first type and a recording medium of the first size and a second type which is not the same as the first type;

causing the output unit to record an image which is rotated in a predetermined angle to a recording medium of the first size and the first type, in a case where said job to be processed requires the recording medium of the first size and the first type; and causing the output unit to record an image which is not rotated in the predetermined angle to a recording medium of the first size and the second type, in a case where said job to be processed requires the recording medium of the first size and the second type, wherein the recording medium of the first type is a punched recording medium which has been already subjected to a punching process, and wherein if the punched recording medium is selected, said output unit is caused to record the image based on the image data after rotating the image data by the predetermined angle on the punched recording medium.

12. An image data output control method according to claim 11, further comprising a punching process step of executing a punching process to a recording medium, in a case where an instruction to execute the punching process to the recording medium is input, and wherein if the punched recording medium is selected, execution of the punching process by the punching process unit is inhibited and execution of recording of the image by the output unit is allowed.

13. An image data output control method according to claim 11, wherein the output unit is caused to record said image which is rotated in said predetermined angle on the recording medium, in a case where an instruction to rotate the image data to the predetermined angle is input, and wherein if at least one of the printed recording medium or a punched recording medium is selected, the output unit is caused to record said image which is rotated in said predetermined angle on the recording medium regardless of an input of the instruction.

14. An image data output control method according to claim 11, wherein the predetermined angle is 180°.

15. An image data output control method according to claim 11, wherein the image output unit records an image based on image data received from at least one external apparatus.

16. An image data output control method according to claim 15, wherein said at least one external apparatus comprises at least one facsimile machine.

17. An image data output control method according to claim 15, wherein said at least one external apparatus comprises at least one printing apparatus which describes data in a page description language.

18. An image data output control method according to claim 15, wherein said at least one external apparatus comprises at least one an image reading apparatus.

19. An image data output control method according to claim 14, wherein card at least one external apparatus comprises at least one personal computer.

20. An image data output control method according to claim 11, further comprising the steps of:
- causing said output unit to record said image which is rotated in said predetermined angle on the recording medium, in a case where an instruction to rotate the image data to the predetermined angle is input; and
- causing said output unit to record said image which is rotated in said predetermined angle on the recording medium, regardless of an input of the instruction, in a case where the job to be processed requires the recording medium of the first size and the first type.

21. An image data output control method according to claim 13, further comprising the steps of:
- allowing execution of a punching process to a recording medium by a punching process unit adapted to execute a punching process to said recording medium, in a case where an instruction to execute the punching process to the recording medium is input; and
- inhibiting execution of the punching process by said punching process unit and allowing execution of recording of the image by said output unit, in a case where the job to be processed requires the recording medium of the first size and the first type.

22. A computer-readable storage medium storing a program for causing an image forming apparatus which includes an image output unit adapted to record an image based on image data to a recording medium, to execute the steps of:
- selecting a recording medium required for a job to be processed from candidates of a plurality of recording media including a recording medium of a first size and a first type and a recording medium of the first size and a second type which is net the same as the first type;
- causing the output unit to record an image which is rotated in a predetermined angle to a recording medium of the first size and the first type, in a case where said job to be processed requires the recording medium of the first size and the first type; and causing the output unit to record an image Which is not rotated in the predetermined angle to a recording medium of the first size and the second type, in a case where said job to be processed requires the recording medium of the first size and the second type,
- wherein the recording medium of the first type is a punched recording medium which has been already subjected to a punching process, and wherein if the punched recording medium is selected, said output unit is caused to record the image based on the image data after rotating the image data by the predetermined angle on the punched recording medium.

* * * * *